United States Patent
Davidson et al.

(10) Patent No.: US 12,450,398 B2
(45) Date of Patent: Oct. 21, 2025

(54) METHODS AND SYSTEMS FOR DETERMINING THE AUTHENTICITY OF A COMPONENT

(71) Applicant: Lexmark International, Inc., Lexington, KY (US)

(72) Inventors: Samuel Davidson, Lexington, KY (US); James Howard Ellis, Lexington, KY (US); Zachary Nathan Fister, Lexington, KY (US); Timothy John Rademacher, Richmond, KY (US); Jennifer Topmiller Williams, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 457 days.

(21) Appl. No.: 18/102,530

(22) Filed: Jan. 27, 2023

(65) Prior Publication Data

US 2024/0143725 A1    May 2, 2024

Related U.S. Application Data

(60) Provisional application No. 63/421,768, filed on Nov. 2, 2022.

(51) Int. Cl.
*G06F 21/73* (2013.01)
*G06F 21/44* (2013.01)
(Continued)

(52) U.S. Cl.
CPC .............. *G06F 21/73* (2013.01); *G06F 21/44* (2013.01); *H04N 1/00875* (2013.01); *H04N 1/4433* (2013.01); *G06F 2221/2103* (2013.01)

(58) Field of Classification Search
CPC ........ G06F 21/44; G06F 21/608; G06F 21/30; G06F 21/73; G06F 2221/21;
(Continued)

(56) References Cited

U.S. PATENT DOCUMENTS

| | | | |
|---|---|---|---|
| 11,768,643 B2 * | 9/2023 | Gremaud | G06F 3/1239 358/1.15 |
| 2004/0223011 A1 * | 11/2004 | Adkins | G03G 15/55 347/7 |

(Continued)

FOREIGN PATENT DOCUMENTS

WO    WO-2007107708 A2 *   9/2007   ......... H04L 63/0869

*Primary Examiner* — Brian F Shaw (57) ABSTRACT

A method of determining trust in a supply item in an imaging device for verifying other supply items installed in the imaging device via an algorithm, wherein the imaging device has a plurality of installed supply items. The method comprises: sending challenge data and an indication of the algorithm to a candidate supply item, receiving a challenge response from the candidate supply item, and determining, by the controller, a status of the challenge response, the status being verified or unverified. When the controller determines that the received challenge response is a correct output of the algorithm when the challenge data is input to the algorithm, the status is determined as verified. Further, an imaging device configured to determine trust in a supply item installed in the imaging device for verifying other supply items installed in the imaging device via an algorithm.

19 Claims, 7 Drawing Sheets

(51) Int. Cl.
*H04N 1/00* (2006.01)
*H04N 1/44* (2006.01)

(58) Field of Classification Search
CPC ............. G06F 3/1236; H04N 1/00875; H04N 1/4433; H04L 9/3271; H04L 9/14; B41J 2/17546; G03G 2221/1823
See application file for complete search history.

(56) References Cited

U.S. PATENT DOCUMENTS

2007/0127936 A1* 6/2007 Miller ................ G03G 15/0863
399/12
2012/0134686 A1* 5/2012 Jones ................ G03G 21/1892
399/12
2014/0169803 A1* 6/2014 Lee ........................ G03G 15/55
399/12

* cited by examiner

METHODS AND SYSTEMS FOR DETERMINING THE AUTHENTICITY OF A COMPONENT

CROSS REFERENCE TO RELATED APPLICATIONS

This application claims priority to U.S. Provisional Patent Application Ser. No. 63/421,768, filed Nov. 2, 2022, entitled "Methods and Systems for Determining the Authenticity of a Component," the contents of which are hereby incorporated by reference in their entirety.

BACKGROUND

1. Technical Field

The present disclosure generally relates to methods and systems for determining the authenticity of a component, and, more particularly, methods and systems for determining the authenticity of a supply item component within an imaging device.

2. Description of the Related Art

In electronic systems, it is often desirable to confirm the authenticity of a component of the electronic system to ensure that the entire system operates as designed. Non-authentic components employ various techniques to mimic the behavior of authentic components. This may include copying the authentic component's circuits and memory contents in order to duplicate authentication algorithms or encrypted communication between the component and the rest of the electronic system. This is particularly important in printing systems where it is desirable to confirm the authenticity of a supply component of the printing system to ensure correct operation.

Non-authentic components may utilize different resources than an authentic component in order to accomplish similar behavior. For example, an encryption scheme done via a hardware circuit on the authentic component may be implemented on a non-authentic component via firmware running on a programmable microcontroller. This makes it easier to produce a non-authentic component which passes as an authentic component.

Accordingly, there is a need for improved systems and methods for determining the authenticity of a component to thwart the use of non-authentic components.

SUMMARY

The present disclosure provides example methods and systems that may be implemented in any general electronic system or specifically in an imaging/printing device/system to thwart the use of non-authentic components.

There is provided a method of authenticating a first supply item in an imaging device, wherein the first supply item is designated as a prover supply item, and a second supply item installed in the imaging device is designated as a verifier supply item, the method comprising: receiving, by the verifier supply item, a challenge response from the prover supply item, and determining, by the verifier supply item, a status of the challenge response, the status being verified or unverified, wherein when the verifier supply item determines that the received challenge response is a correct output of an algorithm when challenge data is input to the algorithm, the status is determined as verified.

There is further provided a supply item configured to perform as a verifier supply item when installed in an imaging device, the verifier supply item being configured to receive a challenge response from a prover supply item installed in the imaging device, and determine, a status of the challenge response, the status being verified or unverified, wherein when the verifier supply item determines that the received challenge response is a correct output of an algorithm when challenge data is input to the algorithm, the status is determined as verified.

There is further provided a method of determining trust in a supply item in an imaging device for verifying other supply items installed in the imaging device via an algorithm, wherein the imaging device has a plurality of installed supply items, the method comprising: sending, by a controller of the imaging device, challenge data and an indication of the algorithm to a candidate supply item, the candidate supply item being one of the installed supply items, receiving, by the controller, a challenge response from the candidate supply item, and determining, by the controller, a status of the challenge response, the status being verified or unverified, wherein when the controller determines that the received challenge response is a correct output of the algorithm when the challenge data is input to the algorithm, the status is determined as verified, and wherein when the status of the challenge response from the candidate supply item is verified, it is determined that the candidate supply item is trusted for the algorithm.

In this application, a controller may comprise printer/imaging device System-on-Chip (SoC), non-volatile memory containing firmware, and/or a system security device which may also be referred to as an imaging device security device and/or a security device of the controller. The system security device may perform some or all of the actions described as performed by the controller. Each supply item may comprise a respective supply item security device and the supply item security devices may perform some or all of the actions described as performed by the supply items.

There is further provided a method of determining trust in a candidate supply item in an imaging device for verifying other supply items installed in the imaging device via an algorithm, wherein the imaging device has a plurality of installed supply items, the method comprising: sending, by a controller of the imaging device unlock data to the candidate supply item, receiving, by the controller, an unlock response, and determining, by the controller, a status of the unlock response, the status being verified or unverified, wherein when the controller determines that the received unlock response is a correct output of an unlock algorithm when the unlock data is input to the unlock algorithm, the status is determined as verified, and wherein when the status of the unlock response from the candidate supply item is verified, it is determined that the candidate supply item is trusted for the algorithm.

There is further provided an imaging device configured to determine trust in a supply item installed in the imaging device for verifying other supply items installed in the imaging device via an algorithm, by: when there are one or more algorithms stored by the controller of the imaging device which have no trusted installed supply item, selecting the algorithm from said one or more algorithms, and performing the method of determining trust as described above.

There is further provided an imaging device comprising a controller, a first supply item and a second supply item, wherein the first supply item is designated as a prover supply item, and the second supply item is designated as a verifier supply item, and the imaging device is configured to authenticate the prover supply item by: sending a challenge response from the prover supply item to the verifier supply item, and determining, by the verifier supply item, a status of the challenge response, the status being verified or unverified, wherein when the verifier supply item determines that the received challenge response is a correct output of an algorithm when challenge data is input to the algorithm, the status is determined as verified.

There is further provided a supply item configured to be operable as a prover supply item when installed in an imaging device, wherein the prover supply item is configured to receive an indication of an algorithm to be performed and receive challenge data, perform the algorithm using the challenge data as input to determine a challenge response, and send the challenge response to a verifier supply item, the verifier supply item being another supply item installed in the imaging device.

The methods and devices above are aspects of a system in which a supply item can verify another supply item in an imaging device. In prior systems, supply items are authenticated by the imaging device in which they are installed. A security device installed on the imaging device, referenced as the system security device, authenticates with the security device installed on the supply item. To prevent non-authentic supply items from being successfully used in the imaging device, it is optimal to change authentication algorithms over the life of the imaging device. Many security devices do not allow firmware updates, so there are limited options for changing these algorithms once the imaging device is already in the field. Authentication methods between two security devices are preferred because they are typically stronger algorithms and harder to defeat. While the imaging device is still being manufactured, changes in the system security device can be made to future imaging devices produced, but this does not affect the imaging devices already in the field.

However, the supply items for an imaging device will be manufactured for many years after the imaging device itself is out of production, so having the supply items authenticate with each other in the manner of the present invention allows new algorithms to be implemented over the entire life of the product, thereby increasing security of the device.

In certain implementations, the controller is configured to maintain a list of algorithms designated as required, wherein the list initially contains algorithms that are stored by the controller, and the controller is configured to add or remove algorithms to or from the list in response to associated firmware updates and/or updates provided by supply items. In certain implementations, the controller is configured to maintain a list of algorithms designated as initial, wherein said list contains indications of all algorithms that are stored by the controller. In certain implementations, a trusted list of algorithms for each supply item installed in the imaging device, wherein when it is determined that a supply item is trusted for a certain algorithm, that algorithm is added to the trusted list for that supply item. In certain implementations, a supported list for each supply item installed in the imaging device is stored each supported list indicating all algorithms which the respective supply item is able to perform. The supported lists may be stored by their respective supply items.

In certain implementations, each algorithm may comprise a cryptographic operation of any type or multiple sequential cryptographic operations of any type and combination.

In certain implementations, the controller is configured to determine if all installed supplies are trusted for all algorithms in the initial list. In certain implementations, the controller is configured to determine whether any supported algorithms for any installed supply item do not appear on any of the trusted lists.

In certain implementations, the second supply item is selected from a set of supply items, the set including all supply items installed in the imaging device which are trusted by the controller for at least one algorithm. In certain implementations, the controller selects the second supply item.

In certain implementations, when at least one supply item installed in the imaging device is untrusted by the controller for at least one algorithm, selecting the first supply item from a set of supply items, the set including all supply items which installed in the imaging device which are untrusted by the controller for at least one algorithm, excluding the second supply item. In certain implementations, selecting the first supply item from the set of supply items comprises selecting the supply item with the most algorithms for which the supply item is untrusted by the controller and/or based on a priority of the supply items. In certain implementations, the verifier supply item selects the first supply item.

In certain implementations, the algorithm is selected from an available set of algorithms. In certain implementations, the verifier supply item selects the algorithm. In certain implementations, the controller is configured to send an indication of an available set of algorithms to the verifier supply item and the verifier supply item is configured to select the algorithm from the available set of algorithms.

In certain implementations, all algorithms in the available set of algorithms are algorithms for which the verifier supply item is trusted by the controller. In certain implementations, all algorithms in the available set of algorithms appear in the trusted list for the verifier supply item.

In certain implementations, all algorithms in the available set of algorithms are algorithms which are designated as required by the controller. In certain implementations, selecting comprises, when the available set of algorithms includes one or more algorithms for which the prover supply item is untrusted by the controller, selecting the algorithm from the one or more algorithms for which the prover supply item is untrusted by the controller.

In certain implementations, selecting further comprises: when the available set of algorithms does not include any algorithms for which another installed supply item is untrusted by the controller, selecting the prover supply item from all installed supply items except the verifier supply item, optionally at random. In certain implementations, selecting the algorithm further comprises: adding, to the available set, any algorithms for which (i) the verifier supply item is trusted by the controller and (ii) are supported by the prover supply item. In certain implementations, selecting the algorithm further comprises: selecting the algorithm from the available set, optionally at random.

In certain implementations, an indication of the selected algorithm is sent to the prover supply item. This may be from the verifier supply item.

In certain implementations, challenge data is generated and sent to the prover supply item. In certain implementations, the verifier supply item generates the challenge data and sends the challenge data to the prover supply item. In certain implementations, the challenge is random data. In certain implementations, the challenge data will be generated using an element of randomness to it, for example it may be data indicating a point on an elliptic curve, where elliptic curve cryptography is utilized in the algorithm. The prover supply item will produce a challenge response that either proves it is in possession of the private key that matches the public key that the verifier has or does not. For example, the elliptic curve encryption scheme could be used, in which case the verifier supply item could generate random data and encrypt it using this scheme to produce challenge data containing a point on the elliptic curve (and other data).

In certain implementations, the challenge data is precalculated and stored in memory on the verifier supply item and/or controller.

In certain implementations, check data is sent to the prover supply item. In certain implementations, the check data is sent to the prover supply item by the controller. In certain implementations, the check data is sent to the prover supply item by the controller, via the verifier supply item. In certain implementations, the check data is randomly generated, optionally by the controller.

In certain implementations, the prover supply item receives the check data, optionally processes the check data, and sends the processed check data to the controller. The prover supply item may send the processed check data to the controller via the verifier supply item. The prover may process the check data by performing one or more arithmetic operations and/or logical operations and/or cryptographic operations on the check data, for example using one or more data operands, optionally stored in non-volatile memory. The arithmetic or logical operation or combination of operations may include an addition, subtraction, multiplication, division, or shift operation. The cryptographic operation may include hashing, signing, encrypting or any other cryptographic operation.

In certain implementations, the prover supply item receives the indication of the algorithm from the verifier supply item and receives the challenge data. In certain implementations, the prover supply item receives the challenge data from the verifier supply item. The prover supply item performs the algorithm using the challenge data as input to determine a challenge response, and sends the challenge response to the verifier supply item. The challenge response is the output of the algorithm when the prover supply item performs the algorithm on the challenge data.

The verifier supply item receives the challenge response from the prover supply item. The verifier supply item determines, a status of the challenge response, the status being verified or unverified, wherein when the verifier supply item determines that the received challenge response is a correct output of an algorithm when challenge data is input to the algorithm, the status is determined as verified.

In certain implementations, the verifier supply item sends the status of the challenge response to the controller. In certain implementations, the verifier supply item sends the indication of the algorithm to the controller. In certain implementations, the verifier supply item sends an indication of the prover supply item to the controller.

In certain implementations, the controller receives the check data from the prover supply item. In certain implementations, the controller determines a status of the received processed check data, the status being verified or unverified. This determination may only occur when the challenge response is verified.

In certain implementations, wherein when the check data is verified and the status of the challenge response is verified, the prover supply item is determined to be authentic and, optionally, trusted for the algorithm. Alternatively, the prover supply item may be required to provide multiple correct challenge responses before the prover supply item becomes a trusted verifier supply item. In certain implementations, when the challenge response is unverified, the controller designates the prover supply item as non-authentic and prevents the prover supply item from operating in the imaging device. In certain implementations, when the check data is unverified and the challenge response is verified, the controller designates the verifier supply item as non-authentic and prevents the verifier supply item from operating in the imaging device.

In certain implementations, two-way authentication is performed, for example, when the first and second supply items are both trusted for at least one algorithm. Two-way authentication includes: redesignating the first supply item as the verifier supply item, redesignating the second supply item as the prover supply item, and receiving, by the verifier supply item, a further challenge response from the prover supply item, and determining, by the verifier supply item, a status of the further challenge response, the status being verified or unverified, wherein when the verifier supply item determines that the received further challenge response is a correct output of a further algorithm when further challenge data is input to the further algorithm, the status of the further challenge response is determined as verified.

All features of one-way verification described above apply equally to the second-way verification except for selection of supply items.

In certain implementations, the controller is configured to determine if all algorithms in the initial list appear on at least one of the trusted lists. When it is determined that there is at least one algorithm that appears in the initial list that does not appear in any of the trusted lists, the imaging device selects one algorithm from the at least one algorithm that appears in the initial list that does not appear in any of the trusted lists and selects a candidate supply item from the installed supply items, optionally at random. The candidate supply item can be considered a prover supply item.

In certain implementations, the controller generates challenge data, optionally at random. In certain implementations, the controller sends the challenge data to the candidate supply item. In certain implementations, the controller sends an indication of the algorithm to the candidate supply item.

In certain implementations, the candidate supply item acts as a prover supply item with the exception of returning the challenge response to the controller instead of a verifier supply item.

In certain implementations, the candidate supply item receives the indication of the algorithm from the controller and receives the challenge data from the controller. The candidate supply item performs the algorithm using the challenge data as input to determine a challenge response, and sends the challenge response to the controller. The challenge response is the output of the algorithm when the candidate supply item performs the algorithm on the challenge data.

The controller determines a status of the challenge response, the status being verified or unverified, wherein when the controller determines that the received challenge response is a correct output of the algorithm when the challenge data is input to the algorithm, the status is determined as verified, and wherein when the status of the challenge response from the candidate supply item is verified, it is determined that the candidate supply item is trusted for the algorithm. When the status of the challenge response is unverified, the candidate supply item is determined to be non-authentic and is prevented from operating in the imaging device.

In certain implementations, an unlock process is followed to determine trust in a supply item for the supported algorithm. In certain implementations, the unlock process is performed when it is determined that all installed supply items are trusted for all initial algorithms and there is at least one supported algorithm for which no supply item is trusted. In certain implementations, a supply item that supports the algorithm for which no supply item is trusted is selected as a candidate supply item.

In certain implementations, unlock data is sent to the candidate supply item by the controller. In certain implementations, the unlock data is generated by the controller, optionally at random. In certain implementations, the controller sends the candidate supply item an indication of the algorithm to be unlocked.

In certain implementations, the candidate supply item receives the unlock data and the indication of the algorithm to be unlocked from the controller. In certain implementations, the candidate supply item performs an unlock algorithm on the unlock data to determine an unlock response. In certain implementations, the candidate supply item sends the unlock response to the controller.

The controller receives the unlock response, and determines, a status of the unlock response, the status being verified or unverified, wherein when the controller determines that the received unlock response is a correct output of the unlock algorithm when the unlock data is input to the unlock algorithm, the status is determined as verified, and wherein when the status of the unlock response from the candidate supply item is verified, it is determined that the candidate supply item is trusted for the algorithm.

In certain implementations, when the status of the unlock response is unverified, the candidate supply item is determined to be non-authentic and is prevented from operating in the imaging device.

In certain implementations, a key is shared between a security device of the controller of the imaging device and a security device of the candidate supply item. This improves security of the unlock process. In certain implementations, the system security device and supply security devices share a key and unlock algorithm for the algorithm identifier. Any cryptographic operation can be used for the unlock algorithm, such as a symmetric algorithm, an asymmetric algorithm, or a hash function. In certain implementations, the cryptographic operation chosen for the unlock algorithm is different than the cryptographic operation of the algorithm to be unlocked. In certain implementations, the key and unlock algorithm are shared at or prior to printer/imaging device manufacturing, are unique to each algorithm identifier, and are not used until an algorithm needs to be unlocked.

In certain implementations, a supply item may be operable as a prover supply item and operable as a verifier supply item. In certain implementations, the supply item is configured to operate as a verifier supply item when the supply item receives verifier trigger information and the supply item is configured to operate as a prover supply item when the supply item receives prover trigger information. Verifier trigger information may include an algorithm list received from the controller and/or check data. Prover trigger information may include receiving challenge data and/or an indication of an algorithm.

In certain implementations, the supply items may each be a toner cartridge, imaging unit or a fuser or another type of supply item.

There is further provided a method of authenticating a first component in an electronic device, wherein the first component is designated as a prover component, and a second component installed in the electronic device is designated as a verifier component, the method comprising: receiving, by the verifier component, a challenge response from the prover component, and determining, by the verifier component, a status of the challenge response, the status being verified or unverified, wherein when the verifier component determines that the received challenge response is a correct output of an algorithm when challenge data is input to the algorithm, the status is determined as verified.

There is further provided a component configured to perform as a verifier component when installed in an electronic device, the verifier component being configured to receive a challenge response from a prover component installed in the electronic device, and determine, a status of the challenge response, the status being verified or unverified, wherein when the verifier component determines that the received challenge response is a correct output of an algorithm when challenge data is input to the algorithm, the status is determined as verified.

There is further provided a method of determining trust in a component in an electronic device for verifying other components installed in the electronic device via an algorithm, wherein the electronic device has a plurality of installed components, the method comprising: sending, by a controller of the electronic device, challenge data and an indication of the algorithm to a candidate component, the candidate component being one of the installed components, receiving, by the controller, a challenge response from the candidate component, and determining, by the controller, a status of the challenge response, the status being verified or unverified, wherein when the controller determines that the received challenge response is a correct output of the algorithm when the challenge data is input to the algorithm, the status is determined as verified, and wherein when the status of the challenge response from the candidate component is verified, it is determined that the candidate component is trusted for the algorithm.

There is further provided a method of determining trust in a candidate component in an electronic device for verifying other components installed in the electronic device via an algorithm, wherein the electronic device has a plurality of installed components, the method comprising: sending, by a controller of the electronic device unlock data to the candidate component, receiving, by the controller, an unlock response, and determining, by the controller, a status of the unlock response, the status being verified or unverified, wherein when the controller determines that the received unlock response is a correct output of an unlock algorithm when the unlock data is input to the unlock algorithm, the status is determined as verified, and wherein when the status of the unlock response from the candidate component is verified, it is determined that the candidate component is trusted for the algorithm.

There is further provided an electronic device configured to determine trust in a component installed in the electronic device for verifying other components installed in the electronic device via an algorithm, by: when there are one or more algorithms stored by the controller of the electronic device which have no trusted installed component, selecting the algorithm from said one or more algorithms, and performing the method of determining trust in a component in an electronic device for verifying other components installed in the electronic device via an algorithm as described above.

There is further provided an electronic device comprising a controller, a first component and a second component, wherein the first component is designated as a prover component, and the second component is designated as a verifier component, and the electronic device is configured to authenticate the prover component by: sending a challenge response from the prover component to the verifier component, and determining, by the verifier component, a status of the challenge response, the status being verified or unverified, wherein when the verifier component determines that the received challenge response is a correct output of an algorithm when challenge data is input to the algorithm, the status is determined as verified.

There is further provided a component configured to be operable as a prover component when installed in an electronic device, wherein the prover component is configured to receive an indication of an algorithm to be performed and receive challenge data, perform the algorithm using the challenge data as input to determine a challenge response, and send the challenge response to a verifier component, the verifier component being another component installed in the electronic device.

The optional features of the above-described imaging devices are equally applicable to the above-described electronic devices. Further, the optional features of the above-described supply items are equally applicable to the above-described components.

In certain embodiments, the electronic/imaging device comprises an electronic/imaging device security device, and/or the first component/supply item comprises a first component/supply item security device and/or the second component/supply item comprises a security device that acts as the second component/supply item security device. In certain embodiments, the security device of the electronic/imaging device and/or first/second component/supply item comprises a processor and optionally, one or more hardware encryption components, such as a hardware AES chip, a hardware DES chip and/or a hardware SHA chip.

In any of the implementations/embodiments described herein, the components may be connected via any shared bus, such as I2C or peer-to-peer.

To make it more difficult for counterfeiters to identify the algorithms, the algorithm identifier and the challenge data and check data can be sent on an encrypted channel. The same size challenge data and response data can be sent and received for all algorithm identifiers. Each algorithm can be adjusted to execute for a similar amount of time, even if dummy command execution is required to be added to align the algorithm timing. A timing requirement can be added which requires the prover supply item to send the challenge response to the verifier supply item in a set amount of time.

The methods and systems described above may be employed in any combination. The optional features described above are equally applicable to all of the described methods, devices, supply items and systems and are not limited to the particular method/device/system with which they are described. The essential features of any of the methods/devices/components/supply items described may be optional features of any other method/device/component/supply item described.

From the foregoing disclosure and the following detailed description of various examples, it will be apparent to those skilled in the art that the present disclosure provides a significant advance in the art of determining the authenticity of a component an electronic system. Additional features and advantages of various examples will be better understood in view of the detailed description provided below.

As used herein, the term 'leader' is equivalent to the term 'master' and can be used interchangeably throughout without changing the meaning. As used herein, the term 'follower' is equivalent to the term 'slave' and can be used interchangeably throughout without changing the meaning. Both terms 'master' and 'slave' take their usual meanings in the art, for example, as used in the official I2C specification.

BRIEF DESCRIPTION OF THE DRAWINGS

The above-mentioned and other features and advantages of the present disclosure, and the manner of attaining them, will become more apparent and will be better understood by reference to the following description of examples taken in conjunction with the accompanying drawings. Like reference numerals are used to indicate the same element throughout the specification.

DETAILED DESCRIPTION OF THE DRAWINGS

It is to be understood that the disclosure is not limited to the details of construction and the arrangement of components set forth in the following description or illustrated in the drawings. The disclosure is capable of other examples and of being practiced or of being carried out in various ways. For example, other examples may incorporate structural, chronological, process, and other changes. Examples merely typify possible variations. Individual components and functions are optional unless explicitly required, and the sequence of operations may vary. Portions and features of some examples may be included in or substituted for those of others. The scope of the disclosure encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

In addition, it should be understood that examples of the disclosure include both hardware and electronic components or modules that, for purposes of discussion, may be illustrated and described as if the majority of the components were implemented solely in hardware.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps or combinations of special purpose hardware and computer instructions.

Disclosed are example systems and methods for determining the authenticity of a component in an electronic system, such as an imaging/printer system.

Figure 1:
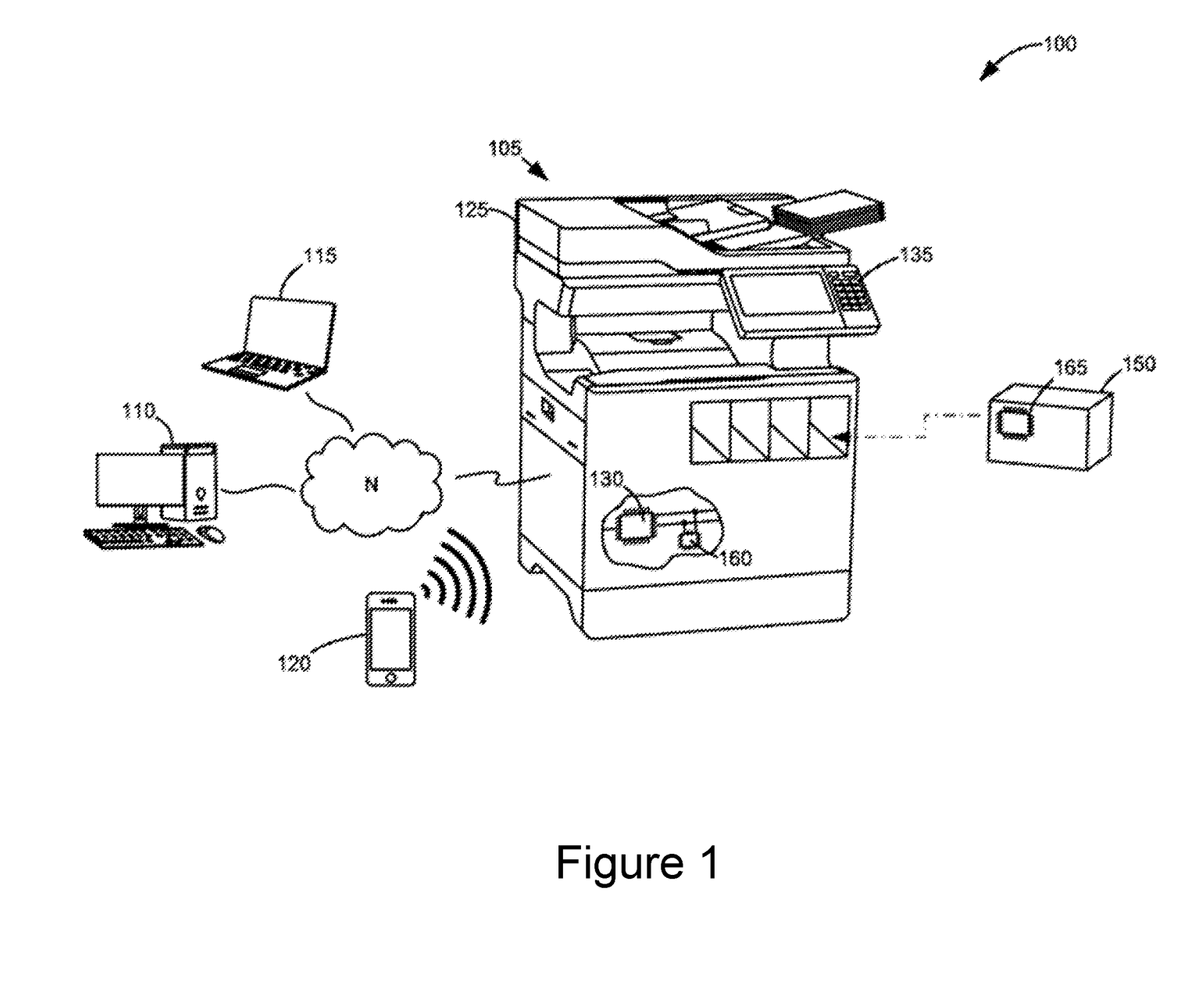
FIG. 1 is a diagrammatic view of an imaging system.

Referring to FIG. 1, there is shown a diagrammatic view of an imaging system 100 used in association with the present disclosure. Imaging system 100 includes an imaging device 105 used for printing images on sheets of media. Image data of the image to be printed on a media sheet may be supplied to imaging device 105 from a variety of sources such as a computer 110, laptop 115, mobile device 120, scanner 125 of the imaging device 105, or like computing device. The sources directly or indirectly communicate with imaging device 105 via wired and/or wireless connections.

Imaging device 105 includes an imaging device component 130 and a user interface 135. The imaging device controller may include component 130 which may include a processor and associated memory. In some examples, imaging device component 130 may be formed as one or more Application Specific Integrated Circuits (ASICs) or System-on-Chip (SoCs). Memory may be any memory device which stores data and may be used with or capable of communicating with processor. For example, memory may be any volatile or non-volatile memory or combination thereof such as, for example, random access memory (RAM), read-only memory (ROM), flash memory and/or non-volatile RAM (NVRAM) for storing data. Optionally, imaging device component 130 may control the processing of print data. Optionally, imaging device component 130 may also control the operation of a print engine during printing of an image onto a sheet of media.

In one example, imaging device 105 may employ an electronic authentication scheme to authenticate consumable supply items and/or replaceable units installed in imaging device 105. In FIG. 1, a representative consumable supply item/replaceable item, such as a toner cartridge 150, is shown (other consumable/replaceable supply items can equally be used in addition or instead, such as imaging units and fusers). Supply item 150 may be installed in a corresponding storage area in imaging device 105. To perform authentication of supply item 150, imaging device 105 may utilize an imaging device security device 160 incorporated in imaging device 105 and a supply item security device 165 of supply item 150.

In one example, imaging device security device 160 in imaging device 105 may be similar to or the same as supply item security device 165 in consumable supply item 150. Optionally, the imaging device security device 160 may be programmed differently from supply item security device 165. Imaging device security device 160 and supply item security device 165 may operate in conjunction with one another to perform authentication functions, as will be explained in greater detail below.

Figure 2:
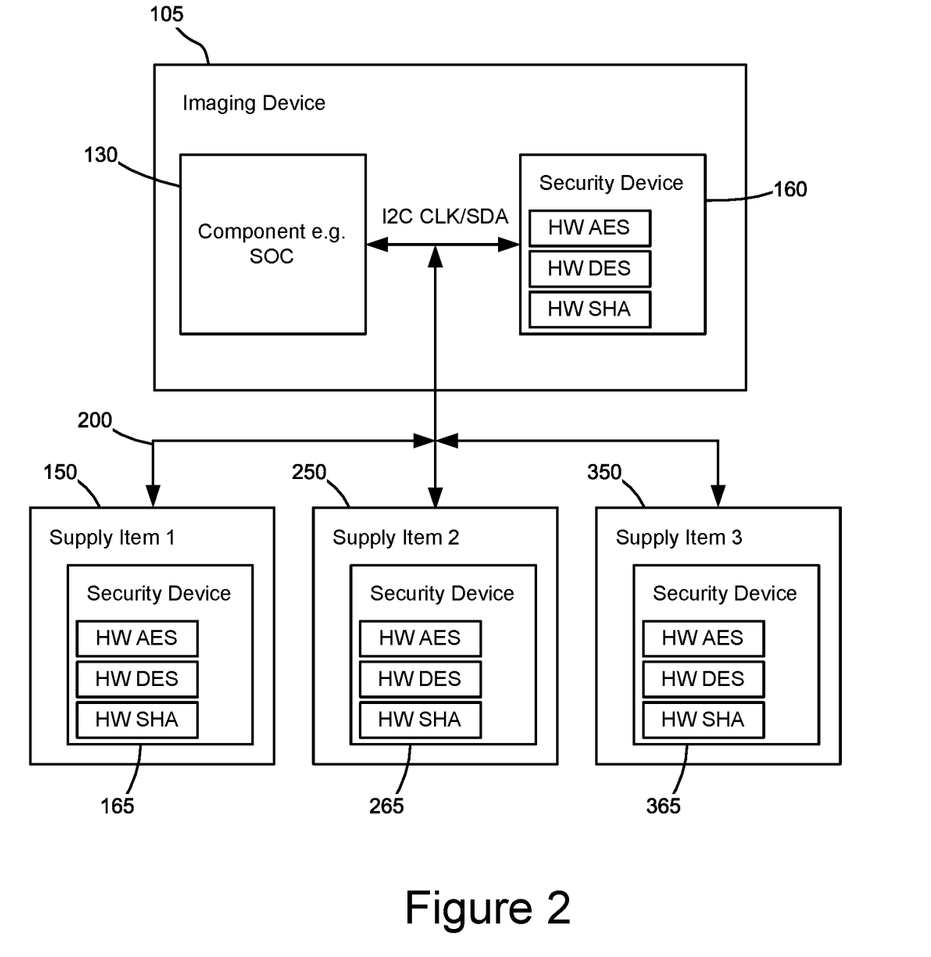
FIG. 2 is a block diagram depicting part of the imaging device of FIG. 1.

FIG. 2 is a block diagram depicting imaging device 105 and supply items 150, 250, 350. In this example, a shared bus system 200 may be employed to control various subassemblies and components (such as supply items 150, 250, 350) and/or obtain status reports thereof. The shared bus system 200 may be an Inter-Integrated Circuit (I2C) interface comprising a serial clock line (SCL) and serial data line (SDA). Various components such as an imaging unit, a toner cartridge 150, and other follower or supply devices and/or addressable components and subassemblies capable of receiving and/or handling data such as a fuser, a laser scan unit, and a media feed mechanism, may be connected to shared bus system 200 (for simplicity FIG. 2 only shows supply items 150, 250, 350 connected to the shared bus system 200). Imaging device component 130 may be generally configured to control a bus leader, which acts as the leader of the shared bus system 200. The bus leader may be implemented as firmware of the imaging device leader component 130. In other embodiments, component 160 may be a follower to component 130, as shown, and a leader to components 150, 250, 350 over an additional shared bus that is separate from 200.

Imaging device security device 160 may operate in conjunction with bus leader to facilitate establishing connections between imaging device component 130 and various components and subassemblies (such as supply item 150) connected to shared bus system 200. For example, imaging device security device 160 may be configured to provide authentication functions, safety and operational interlocks, and/or address change functions related to supply item 150 and other addressable components.

The supply item security device 165 comprises a processor and hardware encryption components, including a hardware AES component, a hardware DES component and a hardware SHA component. A plurality of the hardware encryption components may be located on the same chip. In other embodiments, one or more of these hardware components may be omitted.

The imaging device security device 160 may also comprise a processor and hardware encryption components, including a hardware AES chip, a hardware DES chip and a hardware SHA chip. In other embodiments, one or more of these hardware chips may be omitted. The supply item security device 165 and the imaging device security device 160 may have the same components.

The imaging device 105 may attempt to authenticate a supply item 150 at any point, for example, at fixed time intervals. Additionally/alternatively, the imaging device 105 may attempt to authenticate supply items 150, 250, 350 shortly after a Power On Reset (POR) or shortly after the supply item 150 is installed in the imaging device.

Figure 3:
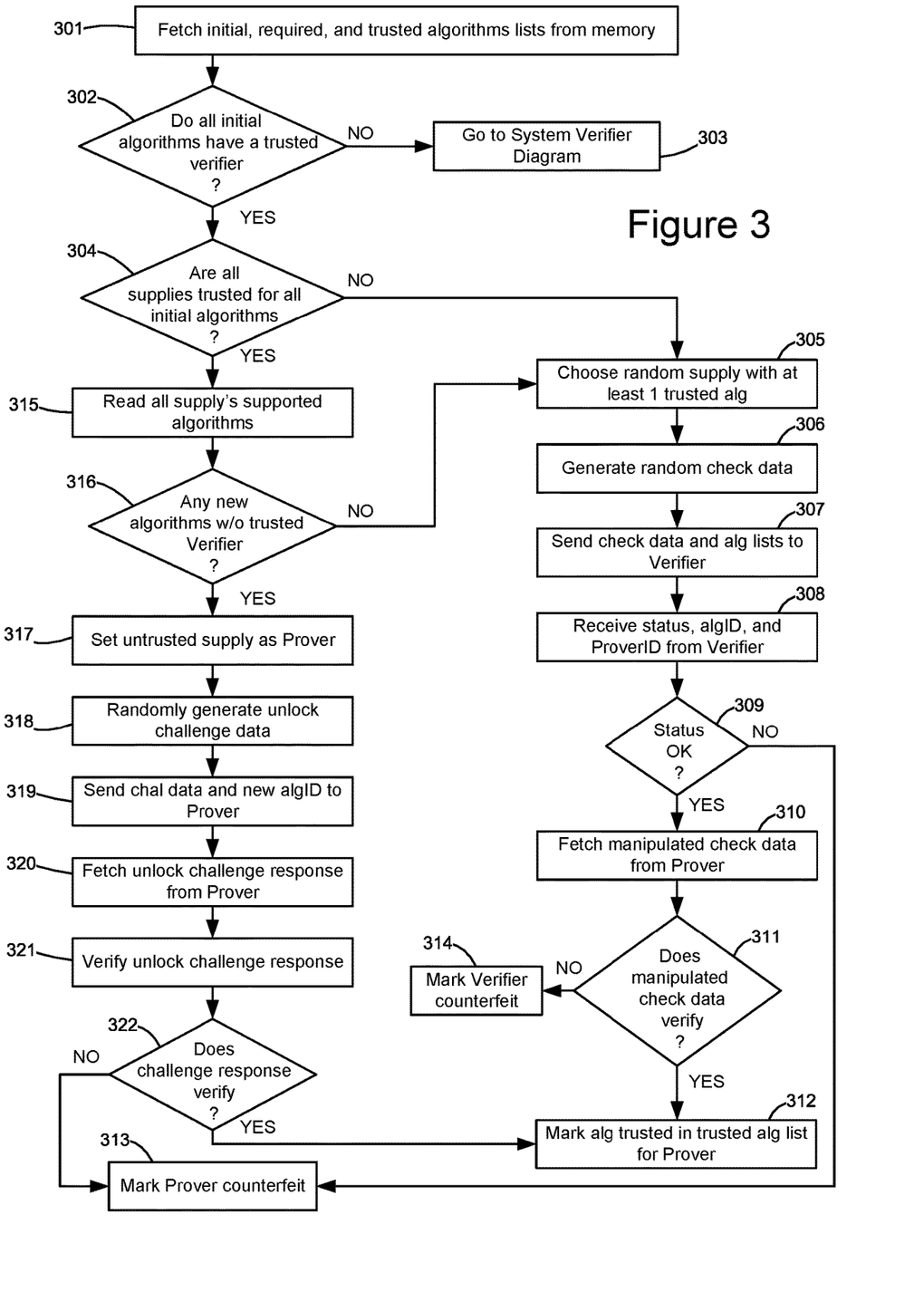
FIG. 3 is a flow diagram illustrating a method associated with the imaging device of FIG. 1.
Figure 4:
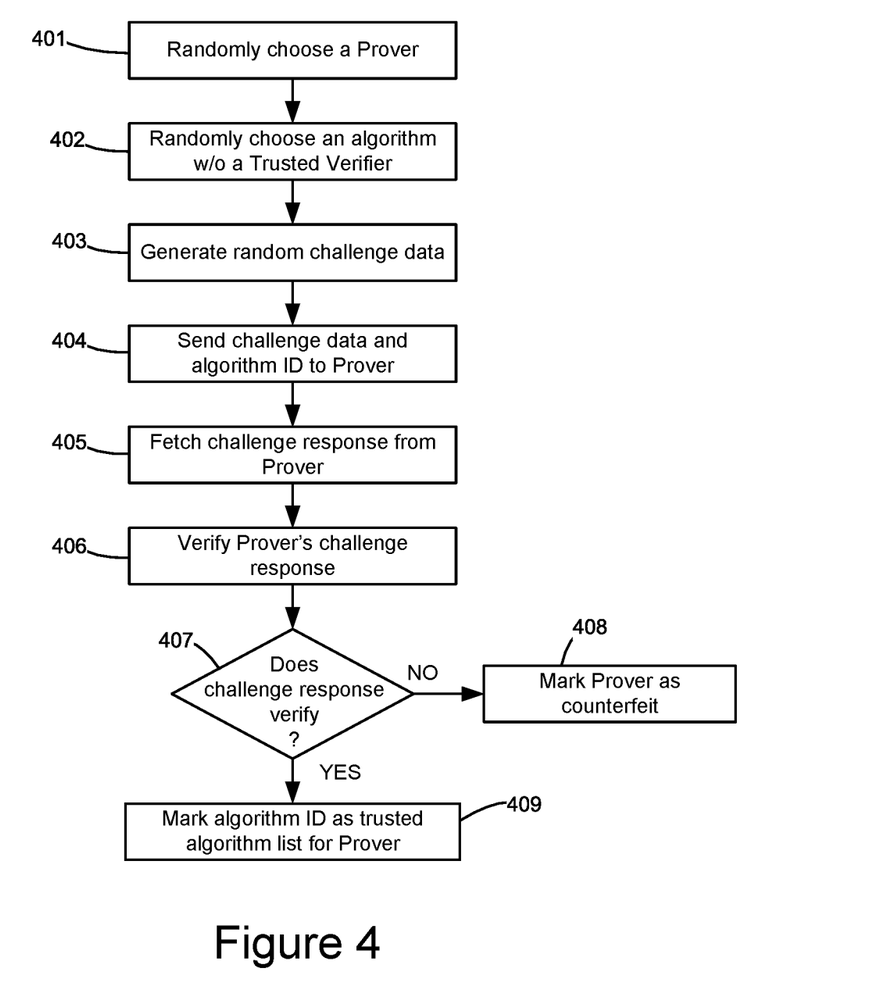
FIG. 4 is a flow diagram illustrating a method associated with the imaging device of FIG. 1.
Figure 5:
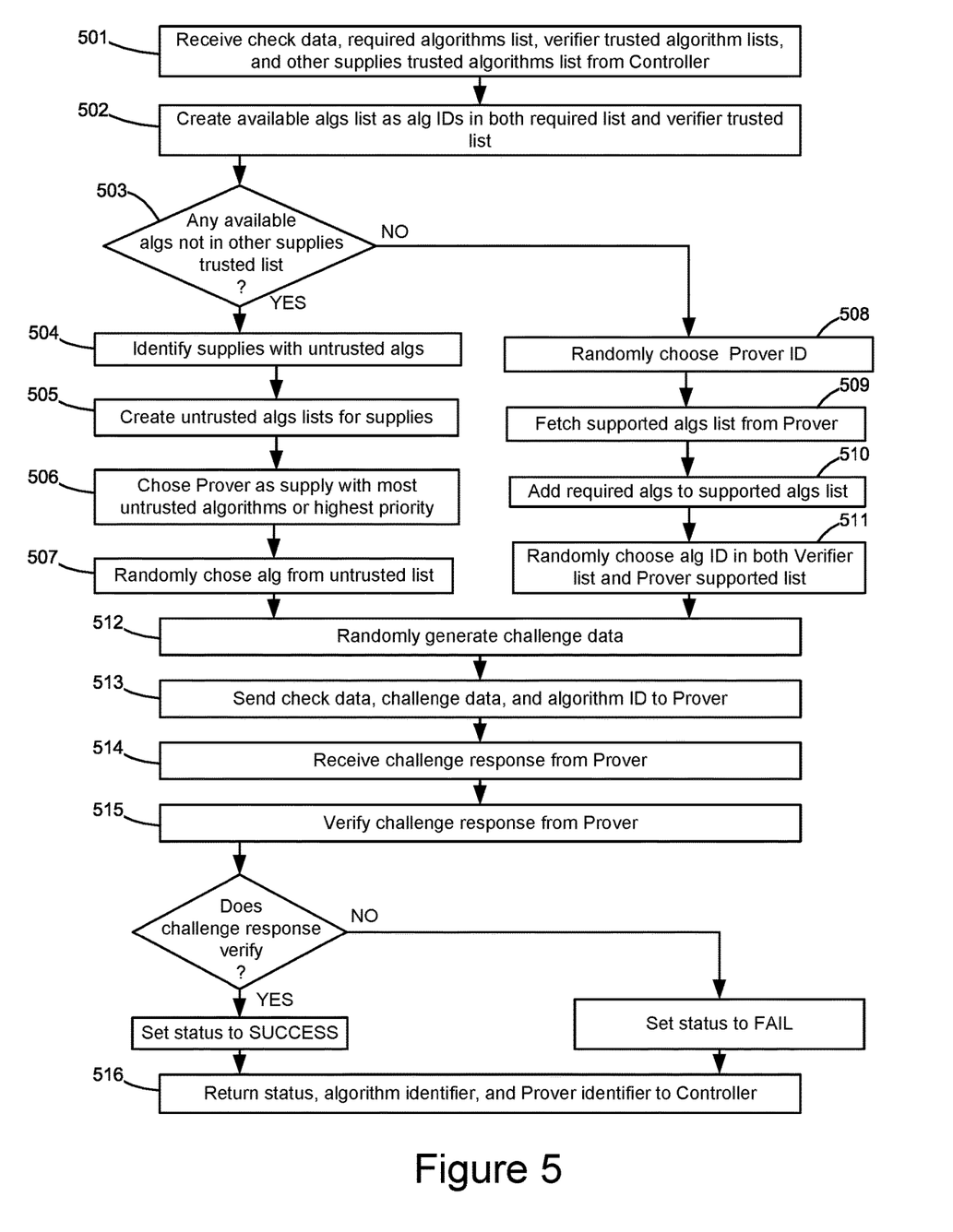
FIG. 5 is a flow diagram illustrating a method associated with the supply item of FIG. 1.
Figure 6:
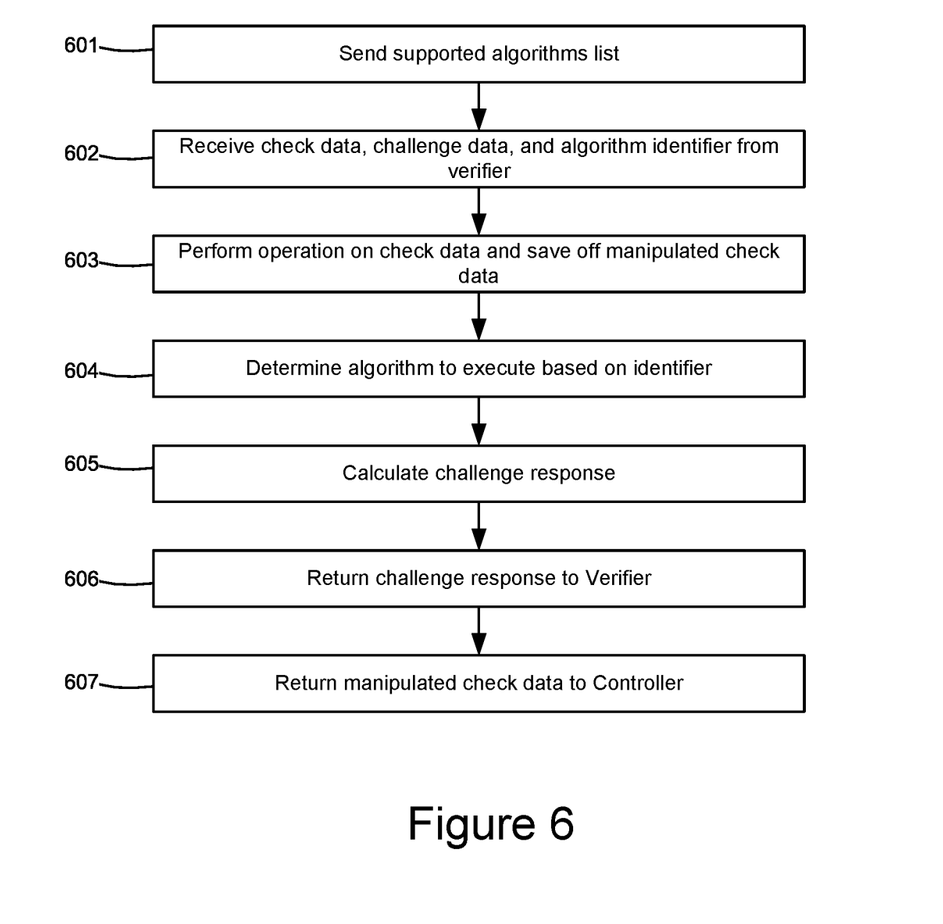
FIG. 6 is a flow diagram illustrating a method associated with the supply item of FIG. 1.

Methods of determining trust in a supply item and methods of authenticating supply items are shown in FIGS. 3 to 6. FIGS. 3 and 4 focus on actions carried out by the controller of the imaging device in this example embodiment. FIG. 5 focusses on actions carried out by a verifier supply item in this example embodiment. FIG. 6 focusses on actions carried out by a prover supply item in this example embodiment.

A controller of the imaging device 105 maintains a list of algorithms designated as required, wherein the list initially contains algorithms that are stored by the controller, and the controller is configured to add or remove algorithms to or from the list in response to associated firmware updates and/or updates provided by supply items. The controller also maintains a list of algorithms designated as initial, wherein said list contains indications of all algorithms that are stored by the controller. A trusted list of algorithms for each supply item installed in the imaging device are also maintained. When it is determined that a supply item is trusted for a certain algorithm, that algorithm is added to the trusted list for that supply item. Any supply item which is installed at manufacturing may be designated as trusted for all initial algorithms. A supported list for each supply item installed in the imaging device is also stored, each list indicating all algorithms which the respective supply item is able to perform. The supported lists are stored by their respective supply items.

When an authentication process begins at step 301 of FIG. 3, the controller fetches the initial, required, and trusted lists from memory. The controller at step 302 determines if all initial algorithms have a trusted verifier supply item. If not, the process moves to FIG. 4 via step 303 and this will be discussed later. If all initial algorithms do have at least one trusted verifier supply item installed in the imaging device, then the controller determines if all installed supplies are trusted for all algorithms in the initial list at step 304. If not all installed supplies are trusted for all algorithms in the initial list, the process moves to step 305. If all installed supplies are trusted for all algorithms in the initial list, the controller determines whether any supported algorithms for any installed supply item do not appear on any of the trusted lists at steps 315 and 316. If there are no supported algorithms that do not appear on any of the trusted lists, then the process moves to step 305.

At step 305, the second supply item is selected by the controller from a set of supply items, the set including all supply items installed in the imaging device which are trusted by the controller for at least one algorithm. The second supply item is designated as the verifier supply item. At step 306, check data is randomly generated by the controller and the algorithm lists and check data is sent to the verifier supply item at step 307.

Looking now at FIG. 5, at step 501, the verifier supply item receives the check data, required algorithms list, verifier trusted algorithms list and other supply items trusted lists from the controller. At step 502, the verifier supply item creates an available algorithms list including algorithms for which the verifier supply item is trusted by the controller and which appear in the required list. At step 503, the verifier supply item determines if at least one supply item installed in the imaging device is untrusted by the controller for at least one algorithm in the available list.

When at least one supply item installed in the imaging device is untrusted by the controller for at least one algorithm in the available list, then at step 504, the supply items which are untrusted by the controller for at least one algorithm in the available list are identified and at step 505, a list is created for each of the identified supply items, each list containing indications of the algorithms in the available list for which the respective supply item is untrusted. The supply item with the most algorithms for which the supply item is untrusted by the controller is then selected and/or a highest priority supply item is selected by the verifier supply item. The first supply item is designated as the prover supply item. At step 507, an algorithm from the selected supply item's untrusted list is selected as the algorithm.

When the available set of algorithms does not include any algorithms for which another installed supply item is untrusted by the controller, the verifier selects the first supply item from all installed supply items except the verifier supply item at random at step 508. The first supply item is designated as the prover supply item. The verifier supply item then fetches a list of the supported algorithms of the prover supply item from the prover supply item at step 509. At steps 510 and 511, the available list is modified by adding any algorithms for which (i) the verifier supply item is trusted by the controller and (ii) are supported by the prover supply item and selecting the algorithm further comprises: selecting the algorithm from the available set at random.

At step 512, challenge data is randomly generated. At step 513, an indication of the selected algorithm, the check data and the challenge data is sent to the prover supply item. The check data is sent to the prover supply item by the controller, via the verifier supply item, by virtue of the verifier receiving the check data from the controller in step 501 and sending the check data to the prover supply item in step 513.

Looking now at FIG. 6, in step 601, the prover supply item sends its supported algorithms list to the verifier supply item. This is received by the verifier supply item at step 509. This step may not be required if the verifier does not fetch the supported algorithms list.

At step 602, the prover supply item receives the check data, challenge data and indication of the algorithm from the verifier supply item. At step 603, the prover supply item processes the check data.

At step 604, the prover supply item determines the algorithm to perform based on the algorithm identifier/indication and at step 605, the prover supply item performs the algorithm using the challenge data as input to determine a challenge response. The challenge response is the output of the algorithm when the prover supply item performs the algorithm on the challenge data.

At step 606, the prover supply item sends the challenge response to the verifier supply item. At step 607, the prover supply item sends the processed check data to the controller.

The prover processes the check data by performing one or more arithmetic operations and/or logical operations and/or cryptographic operations on the check data, for example using one or more data operands, optionally stored in non-volatile memory. The arithmetic or logical operation or combination of operations may include an addition, subtraction, multiplication, division, or shift operation. The cryptographic operation may include hashing, signing, encrypting or any other cryptographic operation.

Turning back to FIG. 5, the verifier supply item receives the challenge response from the prover supply item at step 514.

At step 515, the verifier supply item determines a status of the challenge response, the status being verified or unverified, wherein when the verifier supply item determines that the received challenge response is a correct output of an algorithm when challenge data is input to the algorithm, the status is determined as verified.

At step 516, the verifier supply item sends the status of the challenge response, the indication of the algorithm and an indication of the prover supply item to the controller.

Turning back to FIG. 3, the controller receives the status of the challenge response, the indication of the algorithm and an indication of the prover supply item at step 308. At step 309, when the challenge response is unverified, the controller designates the prover supply item as non-authentic and prevents the prover supply item from operating in the imaging device at step 313.

At step 309, when the challenge response is verified, the process moves to step 310 where the controller receives the processed check data from the prover supply item, for example by fetching the check data. At step 311, the controller determines a status of the received processed check data, the status being verified or unverified. This determination only occurs when the challenge response is verified. At step 312, when the check data is verified and the status of the challenge response is verified, the prover supply item is determined to be authentic and trusted for the algorithm. At step 314, when the check data is unverified and the challenge response is verified, the controller designates the verifier supply item as non-authentic and prevents the verifier supply item from operating in the imaging device.

The controller verifies the received check data by performing the same algorithm as the prover supply item on the original check data and verifying the received/manipulated check data matches. In another instance, the controller performs the opposite operation on the received/manipulated check data and verifies that the calculated check data matches the original check data. For example, the controller performs a subtraction operation if the prover supply item performed an addition operation. This guarantees the expected supply device was used by the verifier. If the manipulated check data is incorrect, then it is assumed that the verifier supply item did not verify the prover supply item and the verifier supply item is marked as a counterfeit supply. If the manipulated check data is correct, the controller marks the prover supply item as a trusted verifier supply item for the specified algorithm.

Optionally, two-way authentication can be performed, for example, when the first and second supply items are both trusted for the algorithm. Two-way authentication includes: redesignating the first supply item as the verifier supply item, redesignating the second supply item as the prover supply item, and following steps 306 to 314 on the controller, steps 512 to 516 on the verifier supply item, and steps 602 to 607 on the prover supply item.

When it is determined that there is at least one algorithm that appears in the initial list that does not appear in any of the trusted lists, the process follows step 303 to the process explained in FIG. 4 as discussed above.

At step 401, the controller randomly selects a candidate/prover supply item and at step 402 randomly selects an algorithm that appears in the initial list that does not appear in any of the trusted lists.

The controller generates challenge data at random at step 403 and sends the challenge data and an indication of the selected algorithm to the candidate supply item at step 404.

The candidate supply item receives the challenge data and an indication of the selected algorithm and acts as a prover supply item, following steps 604 and 605 in FIG. 6 and sending the challenge response to the controller instead of a verifier supply item.

At step 405, the controller receives the challenge response from the candidate supply item and determines a status of the challenge response, the status being verified or unverified at step 406. When the controller determines that the received challenge response is a correct output of the algorithm when the challenge data is input to the algorithm, the status is determined as verified. At step 407 and 409, when the status of the challenge response from the candidate supply item is verified, it is determined that the candidate supply item is trusted for the algorithm. At steps 407 and 408, when the status of the challenge response is unverified, the candidate supply item is determined to be non-authentic and is prevented from operating in the imaging device.

At step 316 of FIG. 3, when there are supported algorithms that do not appear on any of the trusted lists, then the process moves to an unlock process to determine trust in a supply item for a supported algorithm. The unlock process is performed when it is determined that all installed supply items are trusted for all initial algorithms at step 304 and there is at least one supported algorithm for which no supply item is trusted at step 316. A supply item that supports the algorithm for which no supply item is trusted is selected as a candidate/prover supply item at step 317. At step 318, unlock data is randomly generated by the controller and the unlock data is sent to the candidate supply item by the controller at step 319 along with an indication of the algorithm to be unlocked.

The candidate supply item receives the unlock data and the indication of the algorithm to be unlocked from the controller and the candidate supply item performs an unlock algorithm on the unlock data to determine an unlock response. The candidate supply item sends the unlock response to the controller.

The controller receives the unlock response at step 320, and determines, a status of the unlock response at step 322, the status being verified or unverified. When the controller determines that the received unlock response is a correct output of the unlock algorithm when the unlock data is input to the unlock algorithm, the status is determined as verified, and when the status of the unlock response from the candidate supply item is verified, it is determined that the candidate supply item is trusted for the algorithm at step 312.

When the status of the unlock response is unverified, the candidate supply item is determined to be non-authentic and is prevented from operating in the imaging device at step 313.

Figure 7:
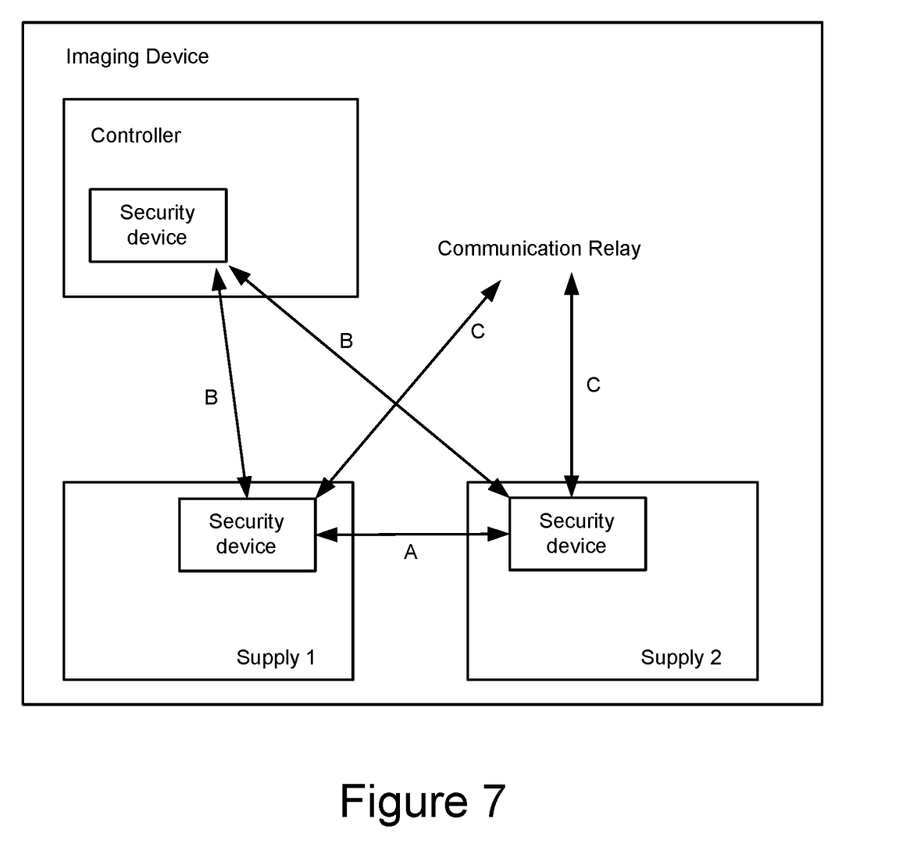
FIG. 7 is a block diagram depicting part of the imaging device of FIG. 1.

As shown in FIG. 7, the supply item security devices can communicate directly with each other (A), using an I2C leader capability (leader/follower interface) for example, or the imaging device can relay communication between the supply items (B, C). The SoC on the controller can act as the communication relay (C).

The above has been described in relation to a specific implementation/embodiment. However, modifications can be implemented within the scope of the application, some of which are detailed below.

In the above implementations/embodiments, the various components are configured as leader/follower components. This is purely optional and other communication busses may be used.

Relatively apparent advantages of the many embodiments include, but are not limited to, providing an authentication system/method which is more difficult to satisfy/replicate due to the role of the verifier supply item in the authentication process.

It will be understood that the example applications described herein are illustrative and should not be considered limiting. It will be appreciated that the actions described and shown in the example flowcharts may be carried out or performed in any suitable order. It will also be appreciated that not all of the actions described in FIGS. 3 to 6 need to be performed in accordance with the example embodiments of the disclosure and/or additional actions may be performed in accordance with other example embodiments of the disclosure.

Many modifications and other embodiments of the disclosure set forth herein will come to mind to one skilled in the art to which these disclosures pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Further disclosure is provided below.

Statement 1: A method of authenticating a first supply item in an imaging device, wherein the first supply item is designated as a prover supply item, and a second supply item installed in the imaging device is designated as a verifier supply item, the method comprising: receiving, by the verifier supply item, a challenge response from the prover supply item, and determining, by the verifier supply item, a status of the challenge response, the status being verified or unverified, wherein when the verifier supply item determines that the received challenge response is a correct output of an algorithm when challenge data is input to the algorithm, the status is determined as verified.

Statement 2: The method of statement 1, further comprising: processing, by the prover supply item, check data, said check data being from a controller of the imaging device, and receiving, by the controller, the processed check data from the prover supply item.

Statement 3: The method of statement 2, further comprising: sending, by the controller, check data to the prover supply item.

Statement 4: The method of statement 2, further comprising: determining, by the controller, a status of the received processed check data, the status being verified or unverified.

Statement 5: The method of statement 1, further comprising: selecting the algorithm from an available set of algorithms.

Statement 6: The method of statement 5, wherein all algorithms in the available set of algorithms are algorithms for which the verifier supply item is trusted by the controller.

Statement 7: The method of statement 6, wherein all algorithms in the available set of algorithms are algorithms which are designated as required by the controller.

Statement 8: The method of statement 6, wherein selecting comprises: when the available set of algorithms includes one or more algorithms for which the prover supply item is untrusted by the controller, selecting the algorithm from the one or more algorithms for which the prover supply item is untrusted by the controller.

Statement 9: The method of statement 8, wherein selecting further comprises: when the available set of algorithms does not include any algorithms for which the prover supply item is untrusted by the controller: adding, to the available set, any algorithms for which (i) the verifier supply item is trusted by the controller and (ii) are supported by the prover supply item and selecting the algorithm from the available set at random.

Statement 10: The method of statement 1, further comprising: selecting the second supply item from a set of supply items, the set including all supply items installed in the imaging device which are trusted by the controller for at least one algorithm.

Statement 11: The method of statement 1, further comprising: when at least one supply item installed in the imaging device is untrusted by the controller for at least one algorithm, selecting the first supply item from a set of supply items, the set including all supply items which installed in the imaging device which are untrusted by the controller for at least one algorithm, excluding the second supply item.

Statement 12: The method of statement 11, wherein selecting the first supply item from the set of supply items comprises selecting the supply item with the most algorithms for which the supply item is untrusted by the controller.

Statement 13: The method of statement 1, further comprising: when all supply items installed in the imaging device are trusted by the controller for all algorithms, selecting the first supply item at random from a set of supply items including all supply items installed in the imaging device except the second supply item.

Statement 14: The method of statement 1, further comprising: redesignating the first supply item as the verifier supply item, redesignating the second supply item as the prover supply item, and receiving, by the verifier supply item, a further challenge response from the prover supply item, and determining, by the verifier supply item, a status of the further challenge response, the status being verified or unverified, wherein when the verifier supply item determines that the received further challenge response is a correct output of a further algorithm when further challenge data is input to the further algorithm, the status of the further challenge response is determined as verified.

Statement 15: A supply item configured to perform as a verifier supply item when installed in an imaging device, the verifier supply item being configured to receive a challenge response from a prover supply item installed in the imaging device, and determine, a status of the challenge response, the status being verified or unverified, wherein when the verifier supply item determines that the received challenge response is a correct output of an algorithm when challenge data is input to the algorithm, the status is determined as verified.

Statement 16: A supply item according to statement 15, wherein the verifier supply item is configured to select the algorithm from an available set of algorithms.

Statement 17: A supply item according to statement 16, wherein verifier supply item is configured to send an indication of the algorithm to the prover supply item.

Statement 18: A supply item according to statement 15, wherein the verifier supply item is configured to send an indication of the algorithm to a controller of the imaging device.

Statement 19: A supply item according to statement 15, wherein the verifier supply item is configured to send the status of the challenge response to a controller of the imaging device, or configured to perform as the verifier supply item when trigger data is received by the supply item from a controller of the imaging device.

Statement 20: An imaging device comprising a controller, a first supply item and a second supply item, wherein the first supply item is designated as a prover supply item, and the second supply item is designated as a verifier supply item, and the imaging device is configured to authenticate the prover supply item by: sending a challenge response from the prover supply item to the verifier supply item, and determining, by the verifier supply item, a status of the challenge response, the status being verified or unverified, wherein when the verifier supply item determines that the received challenge response is a correct output of an algorithm when challenge data is input to the algorithm, the status is determined as verified.

Statement 21: The imaging device of statement 20, wherein the imaging device is further configured to: process, by the prover supply item, check data, said check data being from a controller of the imaging device, and receive, by the controller, the processed check data and determine, by the controller whether the processed check data is verified, wherein when the check data is verified and the status of the challenge response is verified, the prover supply item is determined to be authentic and trusted for the algorithm and when the check data is unverified and/or the challenge response is unverified, the controller designates the prover supply item as non-authentic and prevents the prover supply item from operating in the imaging device.

Statement 22: The imaging device of statement 21, wherein the controller of the imaging device receives the status of the challenge response from the verifier supply item.

Statement 23: The imaging device of statement 20, wherein the controller is configured to send an indication of an available set of algorithms to the verifier supply item and the verifier supply item is configured to select the algorithm from the available set of algorithms.

Statement 24: The imaging device of statement 23, wherein all algorithms in the available set of algorithms are algorithms for which the verifier supply item is trusted by the controller.

Statement 25: The imaging device of statement 23, wherein selecting comprises, when the available set of algorithms includes one or more algorithms for which the prover supply item is untrusted by the controller, selecting the algorithm from the one or more algorithms for which the prover supply item is untrusted by the controller.

Statement 26: The imaging device of statement 25, wherein selecting further comprises: when the available set of algorithms does not include any algorithms for which the prover supply item is untrusted by the controller: adding, to the available set, any algorithms for which (i) the verifier supply item is trusted by the controller and (ii) are supported by the prover supply item and selecting the algorithm from the available set at random.

Statement 27: The imaging device of statement 23, wherein the controller is configured to maintain a list of algorithms designated as required, wherein the list initially contains algorithms that are stored by the controller, and the controller is configured to add or remove algorithms to or from the list in response to associated firmware updates and/or updates provided by supply items.

Statement 28: The imaging device of statement 27, wherein all algorithms in the available set of algorithms are algorithms which are designated as required by the controller.

Statement 29: The imaging device of statement 20, wherein the controller of the imaging device is configured to: select the second supply item from a set of supply items, the set including all supply items installed in the imaging device which are trusted by the controller for at least one algorithm.

Statement 30: The imaging device of statement 20, wherein the controller of the imaging device is configured to: when at least one supply item installed in the imaging device is untrusted by the controller for at least one algorithm, select the first supply item from a set of supply items, the set including all supply items which installed in the imaging device which are untrusted by the controller for at least one algorithm, excluding the second supply item.

Statement 31: The imaging device of statement 30, wherein selecting the first supply item from the set of supply items comprises selecting the supply item with the most algorithms for which the supply item is untrusted by the controller.

Statement 32: The imaging device of statement 20, wherein the verifier supply item of the imaging device is configured to: when all supply items installed in the imaging device are trusted by the controller for all algorithms, select the first supply item at random from a set of supply items including all supply items installed in the imaging device except the second supply item.

Statement 33: The imaging device of statement 20, further configured to: redesignate the first supply item as the verifier supply item, redesignate the second supply item as the prover supply item, and receive, by the verifier supply item, a further challenge response from the prover supply item, and determine, by the verifier supply item, a status of the further challenge response, the status being verified or unverified, wherein when the verifier supply item determines that the received further challenge response is a correct output of a further algorithm when further challenge data is input to the further algorithm, the status of the further challenge response is determined as verified.

Statement 34: A supply item configured to be operable as a prover supply item when installed in an imaging device, wherein the prover supply item is configured to receive an indication of an algorithm to be performed and receive challenge data, perform the algorithm using the challenge data as input to determine a challenge response, and send the challenge response to a verifier supply item, the verifier supply item being another supply item installed in the imaging device.

Statement 35: A supply item according to statement 34, wherein the supply item is configured to receive the indication of the algorithm from the verifier supply item.

Statement 36: A supply item according to statement 34, wherein the supply item is configured to receive check data, process the check data and send the processed check data to a controller of the imaging device.

Statement 37: A supply item according to statement 34, the supply item further configured to be operable as a verifier supply item, wherein the supply item is configured to operate as a verifier supply item when the supply item receives verifier trigger information and the supply item is configured to operate as a prover supply item when the supply item receives prover trigger information.

Statement 38: A supply item according to statement 34, the supply item configured to store a supported list, the supported list indicating all algorithms which the supply item is able to perform.

What is claimed is:

1. A method of determining trust in a supply item in an imaging device for verifying other supply items installed in the imaging device via at least two or more algorithms, wherein the imaging device has a plurality of installed supply items, the method comprising:
   sending, by a controller of the imaging device, challenge data and an indication of the at least two or more algorithms to a candidate supply item, the candidate supply item being one of the installed supply items,
   receiving, by the controller, a challenge response from the candidate supply item, and
   determining, by the controller, a status of the challenge response, the status being verified or unverified, wherein when the controller determines that the received challenge response is a correct output of each of the at least two or more algorithms when the challenge data is input to the at least two or more algorithms, the status is determined as verified, and wherein when the status of the challenge response from the candidate supply item is verified, it is determined that the candidate supply item is trusted for the at least two or more algorithms, and the controller is configured to determine if all installed supplies are trusted for all algorithms in an initial list of the at least two or more algorithms.

2. A method according to claim 1, further comprising selecting the candidate supply item from the installed supply items.

3. A method according to claim 1, further comprising selecting the at least two or more algorithms from a set of algorithms stored by the controller of the imaging device, the set consisting of algorithms for which no supply items installed in the imaging device are trusted.

4. A method according to claim 1, wherein when the status is unverified, the candidate supply item is determined to be non-authentic and the imaging device prevents the candidate supply item from operating.

5. A method of determining trust in a candidate supply item in an imaging device for verifying other supply items installed in the imaging device via at least two or more algorithms, wherein the imaging device has a plurality of installed supply items, the method comprising:

sending, by a controller of the imaging device unlock data to the candidate supply item, receiving, by the controller, an unlock response, and determining, by the controller, a status of the unlock response, the status being verified or unverified, wherein when the controller determines that the received unlock response is a correct output of at least two or more unlock algorithms when the unlock data is input to the at least two or more unlock algorithms, the status is determined as verified, and wherein when the status of the unlock response from the candidate supply item is verified, it is determined that the candidate supply item is trusted for the at least two or more algorithms, and the controller is configured to determine if all installed supplies are trusted for all algorithms in an initial list of the at least two or more algorithms.

6. A method according to claim 5, further comprising: sharing a key between a security device of the controller of the imaging device and a security device of the candidate supply item.

7. A method according to claim 5, further comprising: determining whether the candidate supply item is trusted for all algorithms stored by the controller of the imaging device and, when the candidate supply item is trusted for all algorithms stored by the controller of the imaging device, sending the unlock data to the candidate supply item.

8. A method according to claim 5, wherein the at least two or more algorithms are not stored by the controller of the imaging device.

9. A method according to claim 5, wherein when the status is unverified, the candidate supply item is determined to be non-authentic and the imaging device prevents the candidate supply item from operating.

10. A method according to claim 5, wherein the at least two or more unlock algorithms are unique to the at least two or more algorithms.

11. An imaging device configured to determine trust in a supply item installed in the imaging device for verifying other supply items installed in the imaging device via at least two or more algorithms, by:

when there are at least two or more algorithms stored by the controller of the imaging device which have no trusted installed supply item, selecting the at least two or more algorithms from said at least two or more algorithms, and performing the method of claim 1.

12. An imaging device according to claim 11, further configured to select the candidate supply item from the installed supply items.

13. An imaging device according to claim 11, further configured to select the at least two or more algorithms from a set of at least two or more algorithms stored by the controller of the imaging device, the set consisting of algorithms for which no supply items installed in the imaging device are trusted.

14. An imaging device according to claim 11, wherein the imaging device is configured to determine that the candidate supply item is non-authentic and prevent the candidate supply item from operating when the determined status is unverified.

15. An imaging device according to claim 11, wherein when all installed supply items are trusted for all algorithms stored by the controller of the imaging device, the imaging device is configured to perform the method of claim 5.

16. An imaging device according to claim 15, wherein the imaging device is configured to share a key between a security device of the controller and a security device of the candidate supply item.

17. An imaging device according to claim 15, wherein when the candidate supply item is trusted for all algorithms stored by the controller of the imaging device, the controller of the imaging device is configured to send the unlock data to the candidate supply item.

18. An imaging device according to claim 15, wherein the at least two or more algorithms are not stored by the controller of the imaging device.

19. An imaging device according to claim 15, wherein when the determined status is unverified, the candidate supply item is determined to be non-authentic and the imaging device prevents the candidate supply item from operating.

* * * * *